United States Patent
Boivin

(10) Patent No.: US 10,443,859 B2
(45) Date of Patent: Oct. 15, 2019

(54) WATER HEATING ASSEMBLY FOR PROVIDING HOT WATER IN A REDUCED TIME TO A POINT OF USE, AND RELATED KIT, USE AND METHOD

(71) Applicant: Dominique Boivin, Saint-Hyacinthe (CA)

(72) Inventor: Dominique Boivin, Saint-Hyacinthe (CA)

( * ) Notice: Subject to any disclaimer, the term of this patent is extended or adjusted under 35 U.S.C. 154(b) by 0 days.

(21) Appl. No.: 15/543,870

(22) PCT Filed: Mar. 25, 2015

(86) PCT No.: PCT/CA2015/000214
§ 371 (c)(1),
(2) Date: Jul. 14, 2017

(87) PCT Pub. No.: WO2016/149786
PCT Pub. Date: Sep. 29, 2016

(65) Prior Publication Data
US 2018/0010810 A1 Jan. 11, 2018

(51) Int. Cl.
*F24D 17/00* (2006.01)
*F24H 1/20* (2006.01)
(Continued)

(52) U.S. Cl.
CPC ..... *F24D 17/0089* (2013.01); *F24D 17/0031* (2013.01); *F24D 17/0078* (2013.01);
(Continued)

(58) Field of Classification Search
CPC ............. F24D 17/0089; F24D 17/0031; F24D 19/1051; F24D 17/00; F24D 17/0078; F24H 1/202; F24H 9/124
See application file for complete search history.

(56) References Cited

U.S. PATENT DOCUMENTS 4,257,355 A    3/1981  Cook
4,330,309 A *  5/1982  Robinson, Jr. ...... F24D 19/1054
                                                    237/2 B
(Continued)

FOREIGN PATENT DOCUMENTS

DE       19503741 A1 *  8/1996  ......... F24D 17/0031
DE    102008028984 B3 * 11/2009  ......... F24D 17/0021
(Continued)

OTHER PUBLICATIONS

Control Trends, Globe Valves vs Ball Valves, Dec. 2009, http://controltrends.org/building-automation-and-integration/12/globe-valves-vs-ball-valves/.*
(Continued)

*Primary Examiner* — Steven S Anderson, II
(74) *Attorney, Agent, or Firm* — Brooks Kushman P.C.

(57) ABSTRACT

A water heating assembly, related kit, use and method make use of a temperature control near a point of use of water, so as to reduce a time response for hot water at this point of use are provided. The water heating assembly includes a tank for containing water, an inlet temperature sensor for sensing an inlet temperature of the water upstream of the tank, and a valve located upstream of the tank. The valve is actuated when the sensed inlet temperature reaches a given temperature set-point such that the water is bypassed from the tank and directly sent to the point of use. The water heating assembly is configured such that the point of use can be fed with water at the desired temperature in a reduced time, the water coming directly from the hot water source and/or the water heating assembly, thereby saving water, energy and time.

22 Claims, 10 Drawing Sheets

(51) Int. Cl.
*F24D 19/10* (2006.01)
*F24H 9/12* (2006.01)
*F28D 20/00* (2006.01)

(52) U.S. Cl.
CPC ......... *F24D 19/1051* (2013.01); *F24H 1/202* (2013.01); *F24H 9/124* (2013.01); *F28D 20/0039* (2013.01); *F28D 2020/0069* (2013.01)

(56) References Cited

U.S. PATENT DOCUMENTS

| | | | |
|---|---|---|---|
| 4,505,231 A | 3/1985 | Syler | |
| 4,643,212 A * | 2/1987 | Rothrock | B65D 88/744 |
| | | | 126/640 |
| 4,680,446 A | 7/1987 | Post | |
| 5,054,437 A | 10/1991 | Kale | |
| 5,072,727 A | 12/1991 | Laing et al. | |
| 5,870,024 A * | 2/1999 | Arvelo, Jr. | G01F 23/0053 |
| | | | 200/84 R |
| 2008/0023961 A1* | 1/2008 | Cho | F25B 27/02 |
| | | | 290/2 |
| 2010/0006658 A1* | 1/2010 | Peteri | F24D 17/00 |
| | | | 236/12.12 |
| 2011/0211612 A1 | 9/2011 | Branecky | |
| 2013/0019816 A1* | 1/2013 | Lesage | F24H 1/205 |
| | | | 122/18.31 |
| 2013/0312671 A1* | 11/2013 | Deivasigamani | |
| | | | G06F 17/30902 |
| | | | 122/1 C |
| 2014/0027524 A1* | 1/2014 | Sugimoto | F24H 4/04 |
| | | | 237/8 A |
| 2015/0184870 A1* | 7/2015 | Bernardo | F24D 3/10 |
| | | | 126/641 |
| 2016/0201929 A1* | 7/2016 | Farris | F24D 19/1054 |
| | | | 122/15.1 |

FOREIGN PATENT DOCUMENTS

| | | | |
|---|---|---|---|
| EP | 2244020 A2 | 10/2010 | |
| FR | 2983566 A1 * | 6/2013 | ............. F24H 9/124 |
| FR | 3038368 A1 * | 1/2017 | ......... F24D 17/0031 |
| GB | 2200439 A | 8/1988 | |
| GB | 2483990 A | 3/2012 | |
| WO | 2008041841 A1 | 10/2007 | |

OTHER PUBLICATIONS

Canadian Office Action issued in Patent No. CA 2,887,916, dated Dec. 15, 2015; 4 pages.
Canadian Office Action issued in Patent No. CA 2,887,916, dated Feb. 23, 2016; 4 pages.
Canadian Office Action issued in Patent No. CA 2,887,916, dated Jul. 4, 2016; 5 pages.
Written Opinion and Search Report of International Application No. PCT/CA2015/000214; dated Nov. 10, 2015; 7 pages.

* cited by examiner

WATER HEATING ASSEMBLY FOR PROVIDING HOT WATER IN A REDUCED TIME TO A POINT OF USE, AND RELATED KIT, USE AND METHOD

CROSS-REFERENCE TO RELATED APPLICATION

This application is the U.S. national phase of PCT Application No. PCT/CA2015/000214 filed on Mar. 25, 2015, the disclosure of which is incorporated in their entirety by reference herein.

TECHNICAL FIELD

The present invention generally relates to heating water near a point of use, and more particularly to a water heating assembly and related kit, use and method.

BACKGROUND

Point of use (POU) water heaters are used to provide heated water near a point of use and present an alternative to remote water heaters. POU water heaters include a tap of a sink, a dishwasher, a shower, a bathtub or of any other location where water can be provided. POU water heaters have to adapt to size limitation while providing hot water during a steady period.

Known POU water heaters have limitations. For example, POU water heaters that do not include a water tank require high heating power and are not cost effective. Other POU water heaters including a tank are not able to provide hot water for a steady period when several points of use are solicited at the same time.

In addition, POU water heaters and their heating elements are usually configured and sized to be able to gain 15 to 25° C. for a use flowrate of 2 gallons per minute. However, in countries where winter is especially cold, the water remotely stored in the piping of a water circuit can reach a temperature around 2° C., which needs more than 35° C. to reach an adequate temperature for a shower at 37° C. for example.

There is thus a need for a technology that overcomes at least some of the drawbacks of what is known in the field.

SUMMARY

The present invention responds to the above need by providing a water heating assembly making use of a valve which is switchable to selectively feed water to a point of use through a heating path or a bypass path. In one aspect, there is provided a water heating assembly for providing reheated water to a point of use. The assembly includes a water heating unit for mounting across a piping connecting a hot water source and the point of use and a temperature control assembly.

The water heating unit includes a tank having an inlet for receiving water and an outlet for evacuating the reheated water near a temperature set point; and at least one heating element installed inside the tank to heat water contained in the tank up to near the temperature set point.

The temperature control assembly includes an inlet temperature sensor mountable about the inlet of the tank for sensing an inlet temperature of the water fed through the inlet. The temperature control assembly may further include a valve actuator operatively connected to the inlet temperature sensor, and a valve for mounting across a bypass piping.

The valve allows to bypass the water heating unit and directly feeds the point of use with water from the hot water source. The valve is switchable by the valve actuator between a first position closing the bypass piping when the sensed inlet temperature is below the temperature set point, and a second position opening the bypass piping when sensed the inlet temperature is near the temperature set point.

In some implementations, the water heating unit may further include a water distribution device mounted inside the tank so as to be in fluid communication with the water inlet. The water distribution device may include an elongated body projecting inwardly from the inlet of the tank, and a plurality of holes being arranged along the elongated body and sized to distribute water at a reduced flowrate across a lower portion of the tank.

In some implementations, the temperature control assembly may further include at least one operation temperature sensor for sensing a temperature of the water inside the tank. Optionally, the at least one operation temperature sensor may include a first temperature sensor mounted about a lower part of the tank, a second temperature sensor mounted about a central part of the tank, and a third temperature sensor mounted about an upper part of the tank.

In some implementations, the at least one operation temperature sensor may include an infra-red thermometer, a thermocouple, a quartz thermometer or a combination thereof.

In some implementations, the temperature control assembly may further include a controller operatively connected to the at least one heating element and responsive to the at least one operation temperature sensor, to manage and/or control the temperature set point.

In some implementations, the temperature control assembly may further include an outlet temperature sensor mounted about the water outlet of the tank so as to sense the temperature of the water exiting the water heating unit.

The tank can be made of any appropriate material. In some implementations, the tank may be made of vitreous enamel-lined carbon steel, stainless steel, copper or a combination thereof.

In some implementations, the valve may include a two-port valve, a three-port valve, a four-port valve, a five-port valve or a combination thereof. Optionally, the valve may include a ball valve, a solenoid valve, a gate valve, a knife valve, a plug valve, a thermostatic valve or a combination thereof.

In some implementations, the valve actuator may remotely actuate the valve, or may actuate the valve from an inside of the valve.

In another aspect, there is provided a water heating assembly kit for reheating water near a point of use. The water heating assembly kit includes a water heating unit for mounting across a piping connecting a hot water source and the point of use. The unit includes a tank having a water inlet for receiving water and a water outlet for evacuating reheated water near a temperature set point, and at least one heating element to heat the water contained in the tank up to near the temperature set point. The kit further includes an inlet temperature sensor mountable about the water inlet of the tank for sensing an inlet temperature of the water fed through the water inlet. The kit further includes a bypass piping for mounting between the water inlet and the water outlet of the tank, allowing to bypass the water heating unit and directly feed the point of use with water from the hot water source. The kit further may include a valve actuator operatively connectable to the inlet temperature sensor and a valve for mounting across the bypass piping. The valve is switchable by the valve actuator between a first position closing the bypass piping when the sensed inlet temperature is below the temperature set point, and a second position opening the bypass piping when sensed the inlet temperature is near the temperature set point.

In another aspect, there is provided a use of a water heating assembly for reducing response time of hot water at a point of use. The water heating assembly includes a water heating unit for mounting across a piping connecting a hot water source and the point of use and a temperature control assembly. The water heating unit includes a tank having an inlet for receiving water and an outlet for evacuating the reheated water near a temperature set point; and at least one heating element installed inside the tank to heat water contained in the tank up to near the temperature set point. The temperature control assembly includes an inlet temperature sensor mountable about the inlet of the tank for sensing an inlet temperature of the water fed through the inlet. The temperature control assembly may further include a valve actuator operatively connected to the inlet temperature sensor, and a valve for mounting across a bypass piping. The valve allows to bypass the water heating unit and directly feeds the point of use with water from the hot water source. The valve is switchable by the valve actuator between a first position closing the bypass piping when the sensed inlet temperature is below the temperature set point, and a second position opening the bypass piping when sensed the inlet temperature is near the temperature set point.

In some implementations of the use, the water heating assembly may include any features as defined above and herein.

In another aspect, there is provided a method for reducing response time of hot water at a point of use. The method includes the steps of providing water flowing from a hot water source to the point of use and sensing a temperature of the water downstream the hot water source and near the point of use. The method further includes selectively feeding the water to a heating path wherein the water is heated up to near a temperature set point upstream to the point of use when the sensed temperature is below the user temperature; or to a bypass path wherein the water directly flows from the hot water source to the point of use without additional heating when the sensed temperature is near the temperature set point.

In some implementations, the method may further include controlling the temperature set point.

In some implementations, the feeding of the water to the heating path may be performed at a controlled and/or reduced flowrate.

In some implementations, the method may include sensing a temperature of the water within at least one location of the inside of the tank.

In some implementations, the sensing of the temperature inside the tank may be performed in at least three locations including a lower part, a central part and an upper part of the tank.

In some implementations, the steps of the method may be performed by a water heating assembly as defined above and herein.

While the present invention will be described in conjunction with example embodiments, it will be understood that it is not intended to limit the scope of the invention to such embodiments. On the contrary, it is intended to cover all alternatives, modifications and equivalents as may be included as defined in the present description and appended claims. The objects, advantages and other features of the present invention will become more apparent and be better understood upon reading of the following non-restrictive description of the invention, given with reference to the accompanying drawings.

BRIEF DESCRIPTION OF THE DRAWINGS

Implementations of the water heating assembly, kit thereof, use thereof and related method are represented in and will be further understood in connection with the following figures.

DETAILED DESCRIPTION OF EMBODIMENTS

Figure 1:
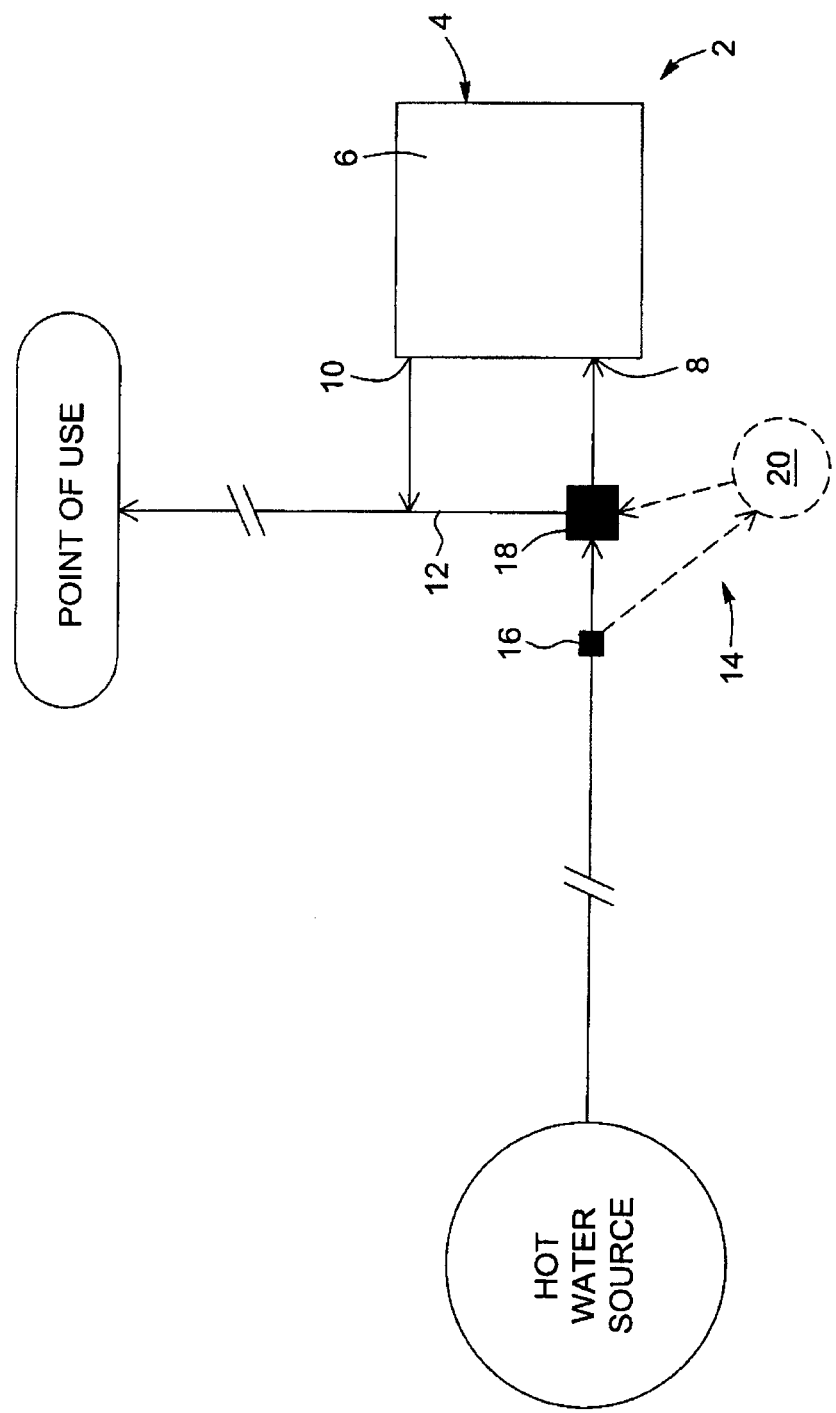
FIG. 1 is schematic flow diagram of a water circuit including a water heating assembly according to an embodiment of the present invention.

In accordance with aspects of the invention, there are provided systems and methods making use of an alternative water heating path for providing water at an adequate user temperature from a hot water source to a point of use in a reduced time.

One skilled in the art would readily understand that the point of use may be embodied by various water outputs, and basically any location where heated water is needed. For example, in a domestic household, the point of use may include a sink, a dishwasher, a washing machine, a shower, a bathtub, a hose, a heat exchanger and analogs thereof.

It should also be noted that the user temperature corresponds to a water temperature desired by a user (or water consumer) at the point of use. It should further be understood that the user temperature also depends on the nature of the point of use, especially on the purpose intended for the water. For example, the user temperature of the water intended to be used in a shower is generally about 37° C., and inferior to the user temperature of the water intended to be used for a dishwasher or washing machine on a hot cycle, e.g. about 60° C. The point of use is provided with any known devices in the plumbing field enabling to provide water at the user temperature resulting from the mixing of cold water and hot water. Hot water herein refers to heated water from a hot water source or reheated water from the water heating assembly according to the present invention. Depending on the water regulations in various countries, the temperature threshold of hot water may be between 40° C. and 100° C., preferably between 50° C. and 70° C.

It will be readily understood that the hot water source is a source able to provide hot water to the point of use, the hot water being mixed with cold water in adequate proportions to reach the user temperature at the point of use. The hot water source can be embodied by a tank containing hot water or any remote water heating device which heats water including a tank and a heating element. For example, in a domestic household, the hot water source can be a principal water heater installed at a remote location from the various points of use in the household.

The response time of hot water (or water at the user temperature) should be understood as the time needed to provide water at the desired user temperature to the point of use upon request of a user. In absence of a water heating assembly according to the present invention for example, the response time of hot water directly depends on the distance travelled by the water between the hot water source and the point of use. Indeed, the water stored in the pipes connecting the hot water source to the point of use can cool down to a temperature inferior to the threshold for hot water. The time needed to evacuate the cooled down water from the pipes corresponds to the response time of hot water in absence of a water heating assembly according to the present invention for example. According to the present invention, systems and methods are provided to reduce the response time of hot water at the point of use, i.e. by making use of a water heating assembly installed at an intermediate location between the hot water source and the point of use.

FIGS. 1 to 16 show various embodiments of the water heating assembly and related method for reducing response time of hot water according to the present invention.

In some implementations, water flows from a hot water source to a point of use by travelling selectively through a heating path or a bypass path. As schematically illustrated in FIG. 1, a water heating assembly 2 can be installed across a piping connecting a hot water source and the point of use so as to provide the heating path to the flowing water. The water heating assembly 2 comprises a water heating unit 4 configured to heat the water to a desired temperature set point. The temperature set point may be chosen in accordance with the hot water threshold temperature. For example, if local regulations impose a threshold of 70° C. for hot water, the temperature set point can be chosen to be inferior or equal to 70° C. The water can follow the heating path when travelling from the hot water source to and through the water heating unit 4, by an inlet 8 and an outlet 10, unto the point of use. Alternatively, the water can follow the bypass path when travelling from the hot water source to the point of use by a bypass piping 12, thereby bypassing the water heating unit 4 to be directly fed to the point of use. The water heating assembly 2 further includes a temperature control assembly 14 allowing water to selectively travel by the heating path or by the bypass path according to a sensed inlet temperature of the water, also referred in FIG. 1 as $T_i$. The temperature control assembly 14 includes an inlet temperature sensor 16 mountable about the inlet 8 for sensing the inlet temperature $T_i$ of the water fed through the inlet 8. One skilled in the art will readily understand that the inlet temperature sensor 16 is preferably mounted at a distance from the inlet 8 which is sufficient to avoid any interference reading in the temperature. The inlet temperature sensor 16 has to read the temperature of the water stored in piping upstream of the water heating unit, not the temperature of the water in the water heating unit. Optionally, the inlet temperature sensor may be mounted at a distance between 20 cm and 50 cm from the inlet 8. The temperature control assembly 14 also includes a valve 18 for mounting across the bypass path, and a valve actuator 20 which is operatively connected to the inlet temperature sensor 16. When sensing an inlet temperature $T_i$ inferior to the temperature set point, referred to as $T_s$ in FIG. 1, the valve 18 is in a first position (or closed position) only allowing water to be fed to the water heating unit 4 so as to be heated therein near the temperature set point $T_s$ before reaching the point of use. When sensing an inlet temperature $T_i$ near the temperature set point $T_s$, the valve actuator 20 actuates the valve 18 in a second and alternative position allowing water to flow through the bypass piping 12. The point of use is therefore fed with water from the water heating unit 4 or from the hot water source through the bypass piping 12 such that a user can benefit from water at the desired user temperature in a reduced response time at the point of use (in comparison to a scenario wherein the water heating assembly 2 is absent).

When using "about" in relation to the inlet, one skilled in the art will readily understand that the inlet temperature sensor may be mounted across the piping connecting the hot water source to the water heating unit, and at a reasonable distance from the water heating unit such that the sensed temperature is indicative of the temperature of the water entering the water heating unit.

When using "near" or "at" in relation to the temperature set point, one skilled in the art will readily understand that the systems and methods according to the present invention allow feeding the point of use with water coming from the bypass path when the absolute difference between the sensed inlet temperature and the temperature set point is for example at most 3° C., optionally 2° C., further optionally 1° C., allowing to account for differences in accuracy and precision of the assembly devices. It should be noted that the valve may be actuated according to different temperature thresholds which are near the temperature set point.

One skilled in the art will readily understand that the valve actuator may be configured to respond to another temperature set point than the temperature threshold for hot water, without departing from the scope of the present invention. For example, the temperature set point can be chosen to be of 3° C. inferior to the temperature threshold of the hot water from the remote hot water source. For example, the temperature threshold of the hot water may be 60° C. and the temperature set point at which the valve is actuated may be 57° C. The temperature set point can be also chosen for example according to the water capacity of the water heating unit. Indeed, to avoid emptying the water heating unit from reheated water while waiting the hot water source to provide hot water at the point of use, the temperature control assembly is set to be responsive to the temperature set point, which water will reach sooner than the temperature threshold for hot water.

It should also be noted that the water heating unit may be configured to heat the water up to a secondary temperature set point which can be different from the temperature set point according to which the valve is actuated. For example, the at least one heating element can be dimensioned to reheat the water contained in the tank up to a secondary temperature set point of 60° C. whereas the valve is actuated to open the bypass piping when the sensed inlet temperature reaches a temperature set point of 58° C. Optionally, the valve may further be actuated to close the bypass piping when the sensed temperature reaches a tertiary temperature set point which may be 57.7° C. (see experimental series section).

In some implementations, the valve may include two or more ports. Further optionally, the valve may be a ball valve, a solenoid valve, a gate valve, a knife valve, a plug valve, a thermostatic valve, derivatives thereof or a combination thereof. For example, the valve may be a 12 V solenoid valve.

One skilled in the art will readily understand that, according to the type of valve implemented in the water heating assembly, the valve actuator and the valve can be integrated as a one-piece structure. For example, if the valve is a solenoid valve, the valve itself is electrically actuated according to the signal received from the inlet temperature sensor.

In some implementations, the valve may open or close gradually so as to combine adequate quantities of water for the hot water source and water from the water heating unit to the point of use.

It should also be noted that, according to piping configuration, location and type of the valve, and/or the value of the temperature set point, the point of use may be simultaneously fed with water from the water heating unit and from the hot water source.

In some implementations, the temperature control assembly may include at least one secondary valve for mounting across the bypass path or the heating path. The at least one secondary valve may have the same characteristics as the valve mounted across the bypass path. The at least one secondary valve may also be actuated according to the sensed inlet temperature of the water entering the water heating assembly. For example, the valve may be mounted across the bypass piping and can be actuated to feed the bypass piping with water from the hot water source when the inlet temperature is at or near the temperature set-point. The secondary valve may be mounted across the heating path, about the inlet or about the outlet of the water heating unit, and can be closed upon reaching at least two conditions, e.g. that the valve is opened and that the temperature at the outlet of the water heating unit is at or above the chosen temperature set point.

Various configurations are illustrated in FIGS. 2 to 11, showing exemplary embodiments of the water heating assembly including one or two valves, the valve(s) being two-ports or more.

Figure 2:
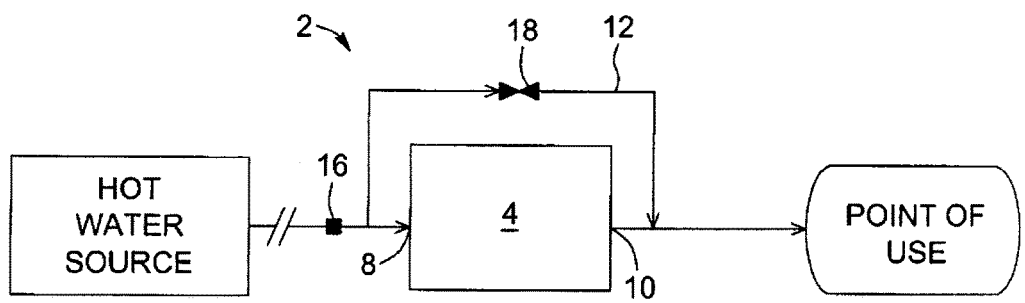
FIG. 2 is a schematic flow diagram of a water circuit including a water heating assembly according to another embodiment of the present invention.
Figure 3:
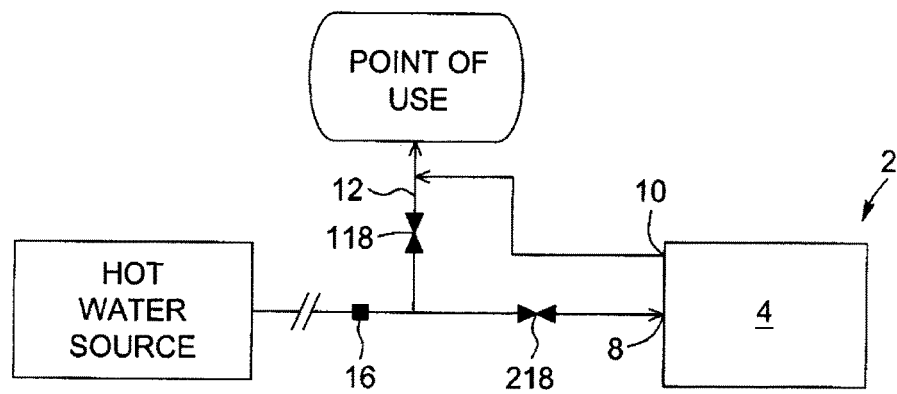
FIG. 3 is a schematic flow diagram of a water circuit including a water heating assembly according to another embodiment of the present invention.
Figure 4:
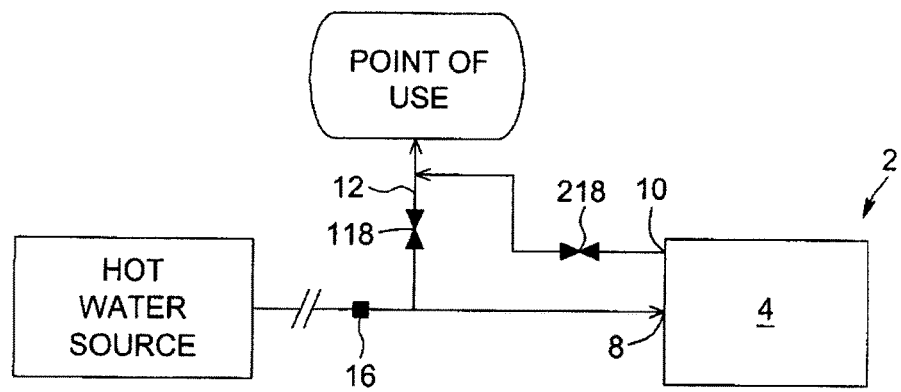
FIG. 4 is a schematic flow diagram of a water circuit including a water heating assembly according to another embodiment of the present invention.

FIG. 2 shows an exemplary embodiment of the water heating assembly 2 including a two-port valve 18 mounted about the bypass piping 12. FIGS. 3 and 4 show exemplary embodiments of the water heating assembly 2 including a two-port valve 118 and a secondary two-port valve 218. The valve 118 is mounted across the bypass piping 12 and the secondary valve 218 is mounted about the inlet 8 or the outlet 10 of the water heating unit 4. In some implementations, according to the configuration and actuation of the valve 118 and secondary valve 218, the point of use can be supplied with heated water from the hot water source and/or the water heating unit 4.

Figure 5:
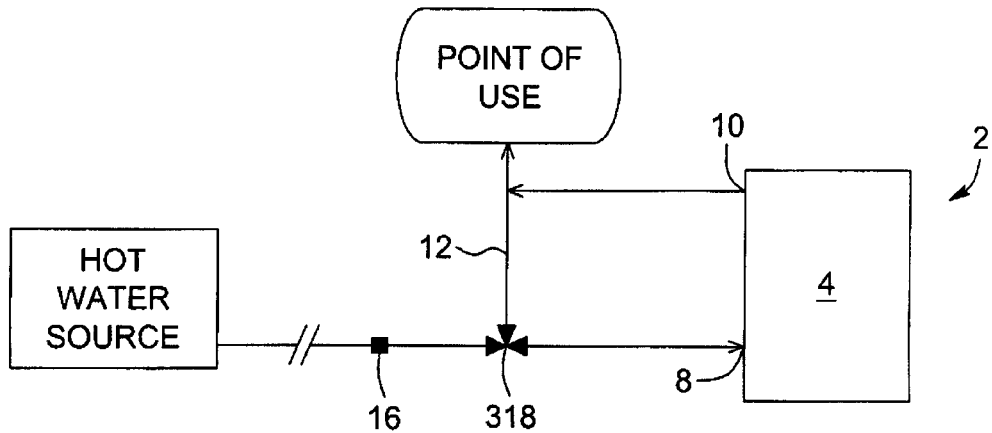
FIG. 5 is a schematic flow diagram of a water circuit including a water heating assembly according to another embodiment of the present invention.
Figure 6:
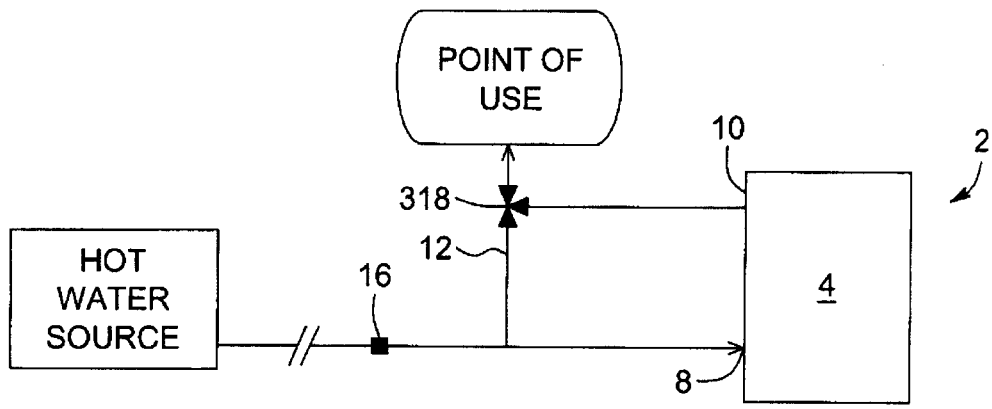
FIG. 6 is a schematic flow diagram of a water circuit including a water heating assembly according to another embodiment of the present invention.

FIGS. 5 and 6 show exemplary embodiments of the water heating assembly 2 including a three-port valve 318. The three-port valve 318 can be mounted about the bypass piping 12 in connection with either the inlet 8 or the outlet 10 of the water heating unit 4. Optionally, the use of a three-port valve allows to selectively feed the point of use with heated water from the hot water source or the water heating unit 4.

Figure 7:
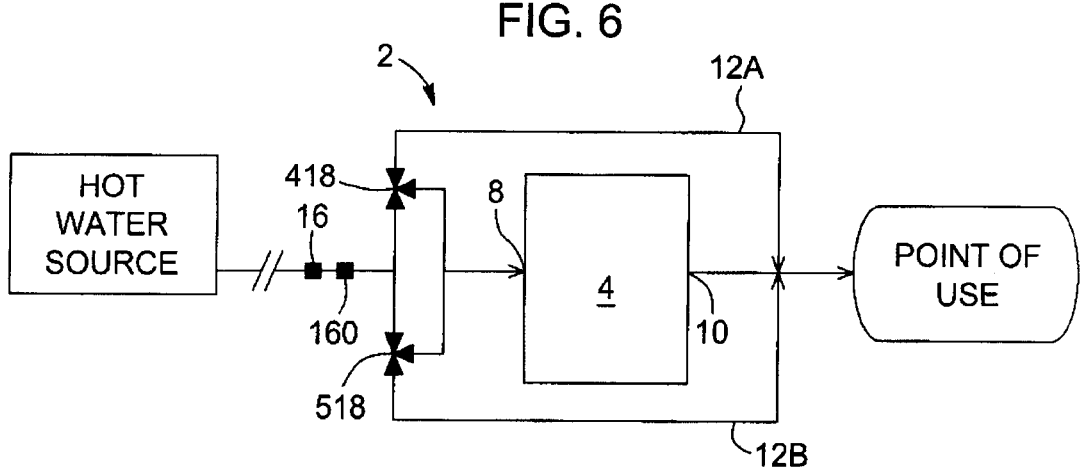
FIG. 7 is a schematic flow diagram of a water circuit including a water heating assembly according to another embodiment of the present invention.

Referring to FIG. 7, the water heating assembly 2 may include a three-port valve 418 and a secondary three-port valve 518. The operating temperature of the water in the water heating unit may be chosen or controlled at 60° C. for example. If the temperature set point is chosen to be 58° C., the three-port valve 418 and the secondary three-port valve 518 are in an open position so as to feed water to the water heating unit 4 through the inlet 8, when the sensed inlet temperature is inferior to the temperature set-point of 58° C. When the sensed inlet temperature reaches the temperature set-point of 58° C., the three-port valve 418 is actuated so as to feed the portion 12A of the bypass piping to the point of use. The secondary three-port valve 518 is actuated to feed the point of use through the portion 12B of the bypass piping when the sensed inlet temperature reaches a secondary temperature set-point which superior the temperature set-point, for example 59° C. Optionally, the secondary three-port valve 518 may be re-actuated so as to feed the water heating unit 4 with heated water through inlet 8 when the sensed temperature inlet is above a tertiary temperature set-point which may be chosen at 61° C. for example.

Figure 8:
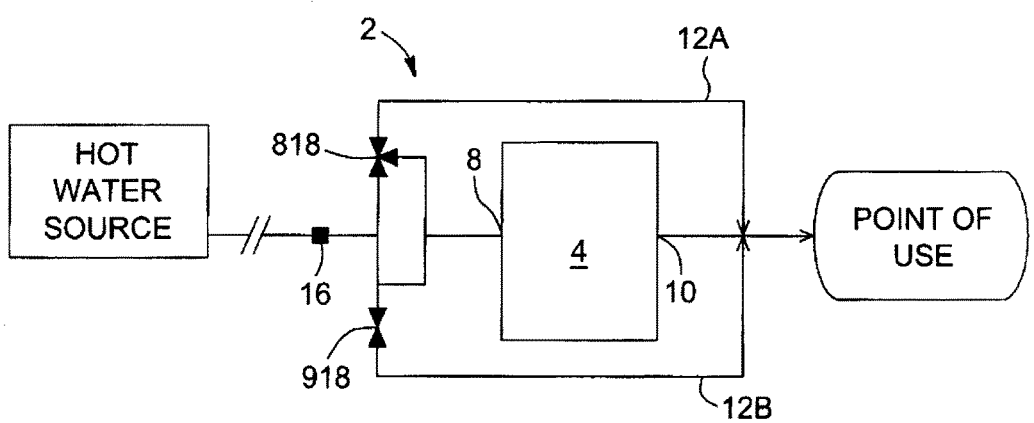
FIG. 8 is a schematic flow diagram of a water circuit including a water heating assembly according to another embodiment of the present invention.

Referring to FIG. 8, the water heating assembly 2 may include a three-port valve 818 and a secondary two-port valve 918. The operating temperature of the water in the water heating unit may be chosen or controlled at 60° C. for example. If the temperature set point is chosen to be 58° C., the three-port valve 818 and the secondary two-port valve 918 are in an open position so as to feed water to the water heating unit 4 through the inlet 8, when the sensed inlet temperature is inferior to the temperature set-point of 58° C. When the sensed inlet temperature reaches the temperature set-point of 58° C., the secondary two-port valve 918 is actuated so as to feed the portion 12B of the bypass piping to the point of use. The three-port valve 818 is actuated to feed the point of use through the portion 12A of the bypass piping when the sensed inlet temperature reaches a secondary temperature set-point which superior the temperature set-point, for example 59° C. Optionally, the three-port valve 818 may be re-actuated so as to feed the water heating unit 4 with heated water through inlet 8 when the sensed temperature inlet is above a tertiary temperature set-point which may be chosen at 61° C. for example.

It should be noted that the valves discussed herein may be actuated or gradually actuated upon reaching various conditions enabling stability of the temperature at the point of use.

Figure 9:
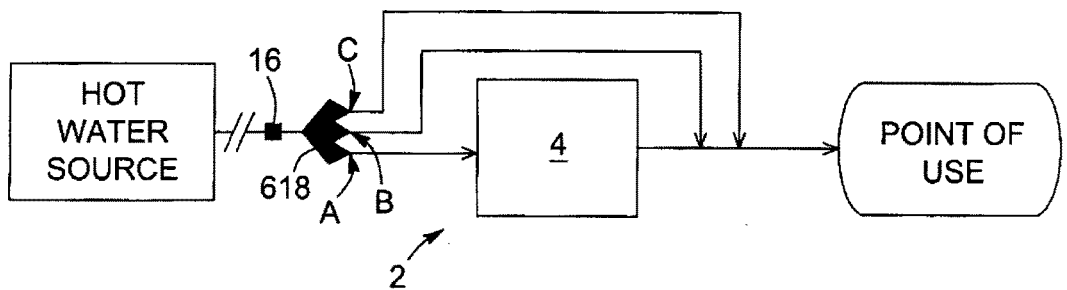
FIG. 9 is a schematic flow diagram of a water circuit including a water heating assembly according to another embodiment of the present invention.
Figure 10:
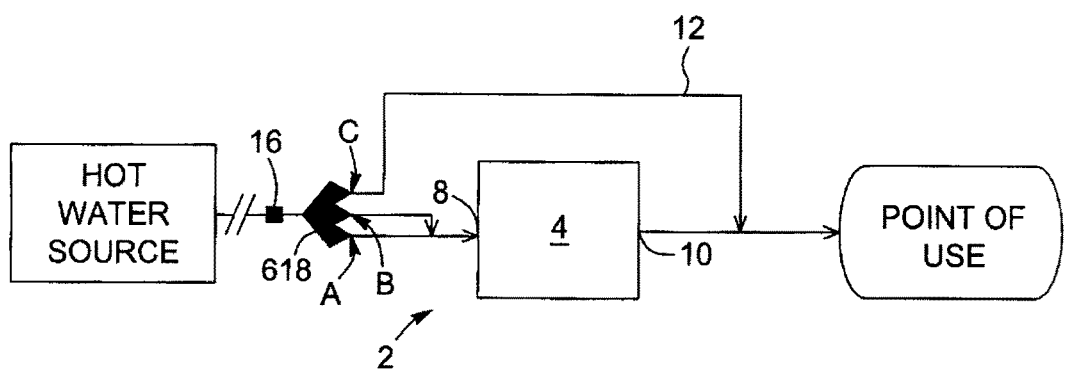
FIG. 10 is a schematic flow diagram of a water circuit including a water heating assembly according to another embodiment of the present invention.

In some implementations, the valve may have at least four ports including a port for receiving water from the hot water source and at least three other ports for distributing water to the water heating unit or the point of use through corresponding piping. FIGS. 9 and 10 show exemplary embodiments of the water heating assembly 2 including a four-port valve 618.

Referring to FIG. 9, the valve 618 may be configured or controlled such that port C of valve 618 opens to feed the point of use when the sensed inlet temperature is near or at the temperature set-point, for example 58° C. Further optionally, the valve 618 may be configured or controlled such that port B opens to feed the point of use when the sensed inlet temperature is near or at a secondary temperature set-point, for example 59° C. Further optionally, the valve 618 may be configured or controlled such that port A prevents or gradually prevents water from being fed to the water heating unit 4 when the sensed inlet temperature is near or at a tertiary temperature set-point, for example 60° C.

Referring to FIG. 10, the valve 618 may be configured or controlled such that port C of valve 618 opens to feed the point of use when the sensed inlet temperature is near or at the temperature set-point, for example 58° C. Further optionally, the valve 618 may be configured or controlled such that port B prevents or gradually prevents water from being fed to the water heating unit 4 when the sensed inlet temperature is near or at a secondary temperature set-point, for example 59° C. Further optionally, the valve 618 may be configured or controlled such that port A prevents or gradually prevents water from being fed to the water heating unit 4 when the sensed inlet temperature is near or at a tertiary temperature set-point, for example 60° C.

Referring to FIGS. 9 and 10, ports A and/or B of valve 618 may be optionally configured or controlled to reopen so as to feed the water heating unit 4 when the sensed inlet temperature is above another temperature set-point, for example 61° C.

Figure 11:
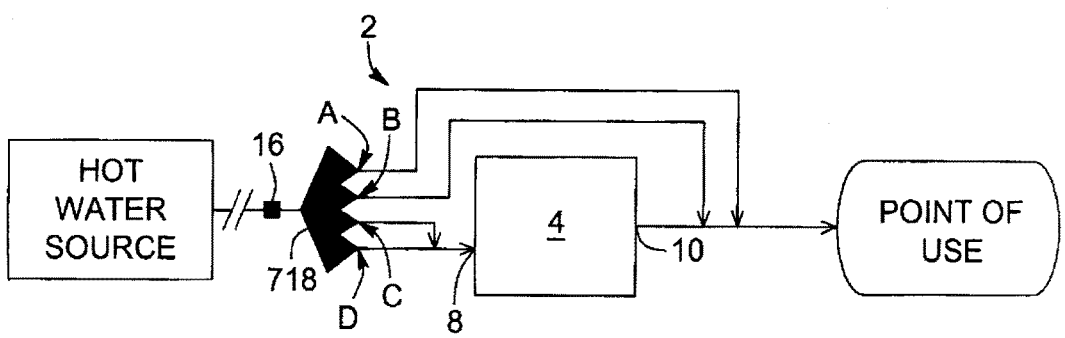
FIG. 11 is a schematic flow diagram of a water circuit including a water heating assembly according to another embodiment of the present invention.

FIG. 11 shows an exemplary embodiment of the water heating assembly 2 including a five-port valve 718. The valve 718 may be configured or controlled such that port A of valve 718 opens to feed the point of use when the sensed inlet temperature is near or at the temperature set-point, for example 58° C. Further optionally, the valve 718 may be configured or controlled such that port B opens to feed the point of use when the sensed inlet temperature is near or at a secondary temperature set-point, for example 59° C. Further optionally, the valve 718 may be configured or controlled such that port C prevents or gradually prevents water from being fed to the water heating unit 4 when the sensed inlet temperature is near or at the secondary temperature set-point. Further optionally, the valve 718 may be configured or controlled such that port D prevents or gradually prevents water from being fed to the water heating unit 4 when the sensed inlet temperature is near or at a tertiary temperature set-point, for example 60° C.

Optionally, as seen in FIGS. 7 to 9 and 11, the bypass path may include two bypass piping for supplying water from the hot water source directly to the point of use. Implementations illustrated in FIGS. 7 to 11 may offer an enhanced temperature stability at the point of use.

It should be understood that the configuration and number of the inlet temperature sensor 16 is not limited to the embodiments illustrated in FIGS. 7 to 11. One skilled in the art will readily understand that any type and number of temperature sensor and/or controller may be used in combination with the valve(s) depending on the chosen configuration. For example, as seen on FIG. 7, two inlet temperature sensors 16 and 160 may be used to respectively provide information to the valve actuator of the valve 418 and the valve actuator of the valve 518.

Figure 12:
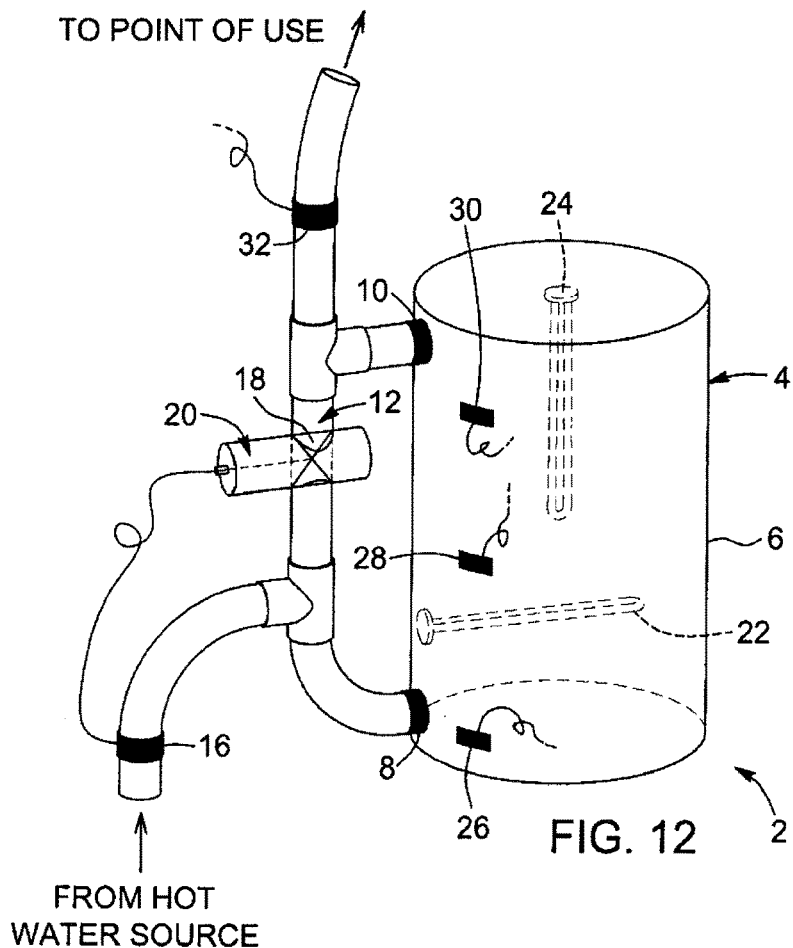
FIG. 12 is a schematic semi-transparent perspective view of a water heating assembly according to an embodiment of the present invention.

In one aspect of the water heating assembly, the water heating unit includes a tank for receiving, storing and providing water. FIG. 12 illustrates an exemplary embodiment of the water heating unit 4 including a tank 6 having an inlet 8 for receiving water and an outlet 10 for evacuating reheated water near or at the temperature set point. Optionally, inner surfaces of the tank 6 may be lined with one to three layers of vitrified material. Further optionally, the tank 6 may be made of vitreous enamel-lined carbon steel, stainless steel, copper or a combination thereof. Further optionally, the tank may be recovered with an insulation layer (not illustrated in the Figures) to minimize heat loss of the water stored inside the tank.

Water capacity of the tank may be chosen according to the water needs at the point of use. For example, for a water heating assembly suited for providing water to a shower in a domestic household, the tank may have a water capacity between 5 L and 12 L. One skilled in the art will readily understand that the water capacity of the water heating unit may greatly vary, depending on the distance between the hot water source and the water heating unit, i.e. depending on the piping length. For example, if the distance between the hot water source and the water heating unit is between 1.5 m and 4.5 m, a water capacity of 5 L for the tank 6 may be suited. Alternatively, if the distance between the hot water source and the water heating unit is between 9 m and 15 m, a water capacity of 11.5 L or more for the tank 6 may be preferred for example. The tank 6 illustrated in FIG. 12 is cylindrical but it should be understood that the shape of the tank may vary and also includes parallelepipedic shapes enabling to save space under a sink for example.

In another aspect of the water heating assembly, the water heating unit includes at least one heating element to heat the water contained inside the tank up to the temperature set point. It should be noted that the at least one heating element may be any known heating elements in the field of domestic water heating that can be installed inside a water tank. Optionally, the water heating unit may include two heating elements to ensure even heating of the water inside the tank. Referring to FIG. 12, the water heating unit 4 may include a first heating element 22 that is mounted in a lower portion of the tank 6 and a second heating element 24 that is mounted in an upper portion of the tank 6. Further optionally, the water heating unit may include a plurality of heating elements without departing from the scope of the present invention. Type, number and position of the heating elements are optionally chosen according to a heating capacity with respect to the volume of water to be heated (i.e. with respect to the volume of the tank).

Figure 13A:
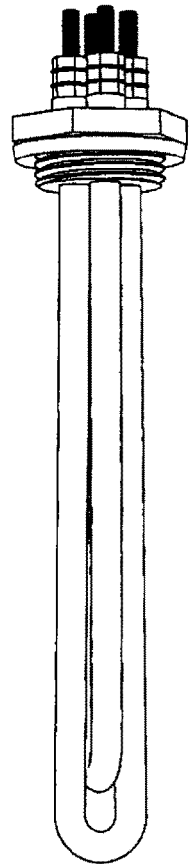
FIG. 13A is a schematic drawing of a model of heating element according to an embodiment of the present invention.
Figure 13B:
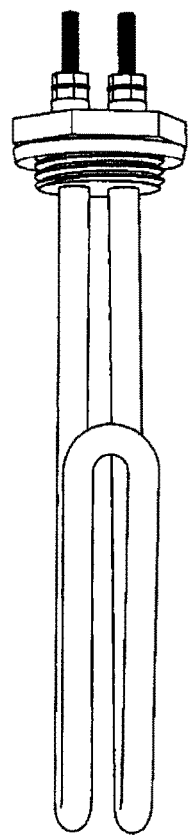
FIG. 13B is a schematic drawing of a model of heating element according to an embodiment of the present invention.
Figure 13C:
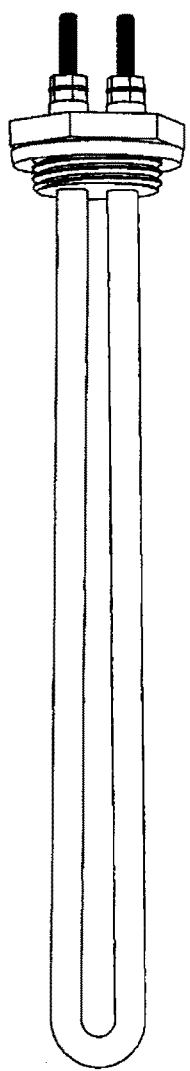
FIG. 13C is a schematic drawing of a model of heating element according to an embodiment of the present invention.

FIG. 13 is a picture of three exemplary models A to C of heating element that can be installed in the tank. When the water capacity of the tank enables to use only one heating element to evenly heat the water near the user temperature, the heating element may optionally be model A which is installed in the lower portion of the tank. Optionally, model A has two sub-elements, each sub-element having 750 W of heating power. Models B and/or C can be used in combination with model A when the water heating unit has to include two or more heating elements inside the tank. Model B may optionally have 750 W or 1500 W of heating power and model C may optionally have 750 W or 1500 W of heating power. One skilled in the art would know how to choose the power of the heating element according to the water needs. Optionally, the total power provided by the at least one heating element may be 3000 W.

In some implementations, the water heating unit may further include at least one operation temperature sensor to sense the temperature of the water inside the tank of the water heating unit. Referring to FIG. 12, the tank 6 of the water heating unit 4 may include a first operation temperature sensor 26 mounted about a lower part of the tank 6, a second operation temperature sensor 28 mounted about a central part of the tank 6 and a third operation temperature sensor 30 mounted about an upper part of the tank 6. The location of the operation temperature sensors 26, 28 and 30 may be chosen to sense the temperature in strategic locations inside the tank. For example, for a tank having a water capacity between 10 L and 12 L, the first operation temperature sensor may be located between 0 cm and 14 cm from the bottom of the tank, the second operation temperature sensor may be located between 4 cm and 18 cm from the bottom of the tank and the third operation temperature sensor may be located between 0 cm and 7 cm from the top of the tank. One skilled in the art will readily understand the number of operation temperature sensors than can be included in the temperature control assembly is not limited to three. More operation temperature sensors may be provided for installation on the tank according to the control accuracy needed by a user for example. For example, when the water heating unit includes two heating elements, five operation temperature sensors may be suited for installation. For example, the first additional temperature sensor may be located between 7 cm and 21 cm from the top of the tank, and the second additional temperature sensor may be located between 0 cm and 21 cm from the top the tank.

In some implementations, the temperature control assembly may include an outlet temperature sensor 32 for sensing an outlet temperature of the reheated water leaving the tank through the outlet as seen on FIG. 12. The water heating assembly is configured such that the outlet temperature is near or equal to the temperature set point. The outlet temperature sensor allows checking the water heating assembly performance and the sensed outlet temperature can be used as a controlling parameter for actuating one or more valves from the water heating assembly.

Figure 14:
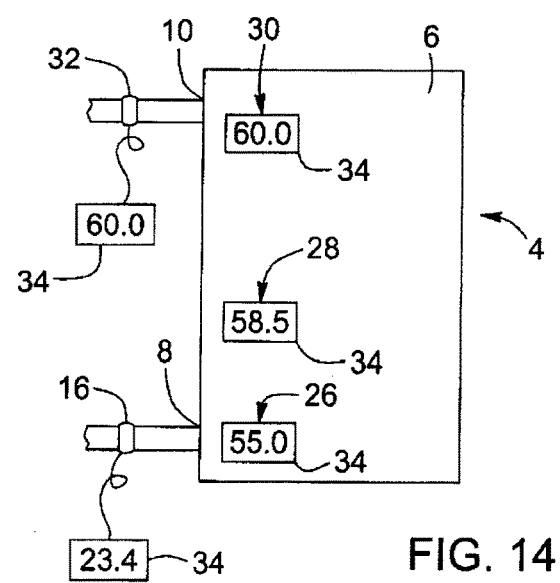
FIG. 14 is a schematic diagram of a water heating unit according to an embodiment of the present invention.

Optionally, the temperature sensors that can be used in the various embodiments of the present invention may include a temperature display allowing a user to easily know the temperature at the inlet and/or inside the tank of the water heating unit. FIG. 14 illustrates an embodiment of the water heating unit 4 including only one heating element (not shown in FIG. 14) configured and controlled to heat the water inside the tank to a temperature of 60° C.

An individual display 34 for each of the temperature sensors 16, 26, 28, 30, 32 informs the user about the operation of the water heating assembly by displaying the corresponding temperatures. The sensors provide knowledge of the temperature or other parameters in various locations of the water heating assembly which can be used in the purpose of controlling operation of the water heating assembly. For example, the temperature sensors can be used in combination with a temperature controller which control the at least one heating element according to the sensed temperature inside the tank and/or control the valve(s) according to the sensed inlet temperature. Optionally, the at least one operation temperature sensor and the temperature controller may be integrated as a thermostat.

For example, the thermostat 30 may be set at a temperature of 60° C. and orders the heating element to heat the water until said thermostat 30 senses a temperature of 60.3° C. The thermostat 28 may be set at a temperature of 58.5° C. and orders the heating element to heat the water until said thermostat 28 senses a temperature of 58.8° C. The thermostat 26 may be set at a temperature of 55° C. and orders the heating element to heat the water until said thermostat 26 senses a temperature of 55.3° C. It should be noted that two additional sensors or thermostats may be added in an upper portion of the tank if the water heating unit includes two heating elements for example.

Optionally, the temperature sensors according to the present invention may include an infra-red thermometer, a thermocouple, a quartz thermometer or a combination thereof. Preferably, the inlet temperature sensor for sensing the temperature of the water from the hot water source and entering the water heating unit is an infra-red thermometer. Depending on the type of sensor, the at least one operation temperature sensor may be mounted about an inner surface of the tank or an outer surface of the tank.

One skilled in the art will readily understand that the valve actuator may be further configured to respond to other parameters including for example water consumption of the water heating unit. Optionally, the water heating unit may include a flow meter or flowrate counter to measure the quantity or flowrate of water released from the tank. The valve actuator can be operatively connected to the flowrate counter such that, the valve is actuated to open the bypass piping to the point of use, when the water quantity which has been released from the tank reaches about half of the tank capacity (and even if the inlet temperature of the water is inferior to the temperature set-point). It should be understood that other parameters could be displayed according to the sensors included in the water heating assembly, e.g. the water pressure, the humidity level, etc.

In some implementations, the water heating assembly may include a controller which is operatively connected to the inlet temperature sensor, optional operation temperature sensors and/or optional flowrate counter. The controller may optionally display the various sensed parameters. The controller may also be configurable by a user of the assembly, for example by setting a temperature set-point or a flowrate count set point to which the valve actuator is responsive. The controller may further be operatively connected to the valve actuator such that the valve can be actuated, upon order of the controller, in response to the sensed parameters. Further optionally, the controller may include a timer which is set to actuate the valve and open the bypass piping after a given time.

In another aspect of the present invention, there is provided a water distribution device mountable inside a tank. In some implementations, the water distribution device may be used in combination with the above defined water heating assembly. The water heating assembly may include at least one water distribution device having an elongated body projecting inwardly from the inlet, the elongated body being perforated with a plurality holes being arranged along the elongated body and sized to distribute water at a reduced flowrate across a lower portion of the tank to ensure stability of the water temperature inside the tank.

The use of the water distribution device can enhance the ability of the water heating assembly to provide water near the user temperature steadily to the point of use, while the tank of the water heating unit is fed with colder water. By providing water inside the tank through a plurality of holes distributed across the tank, water turbulence of colder water are reduced or prevented from reaching an upper part of the tank where the reheated water is evacuated.

Figure 15:
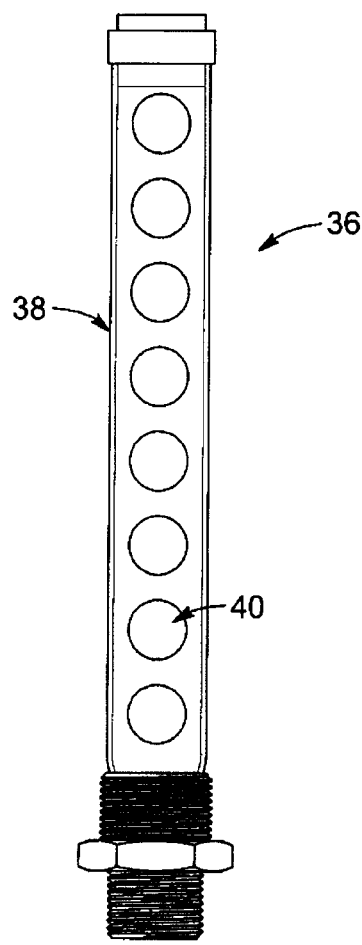
FIG. 15 is a picture of a water distribution device according to an embodiment of the present invention.

FIG. 15 is a picture of an exemplary water distribution device 36 having an elongated tubular body 38 made of flexible plastic which is perforated with a plurality of holes 40. One skilled in the art will readily understand that may other material can be used to make the tubular body including any material suited for use with water (stainless steel, copper, ductile iron, cast iron, polyethylene, polypropylene, polyvinyl chloride, etc.).

Figure 16:
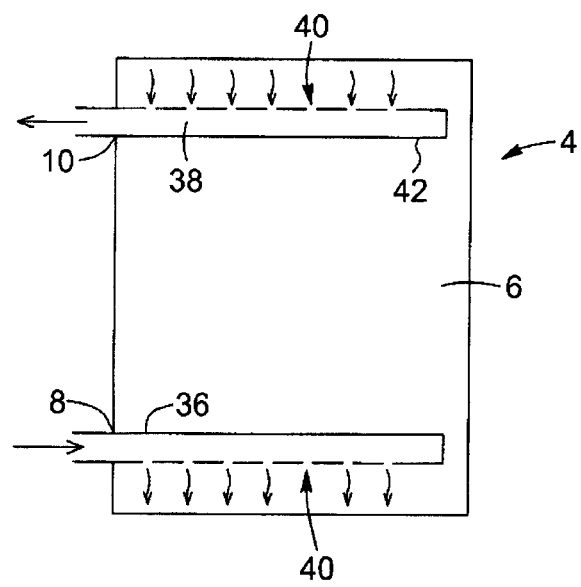
FIG. 16 is a schematic cross-section view of a water heating unit according to an embodiment of the present invention.

Referring to FIG. 16, a first water distribution device 36 may be mounted about the inlet 8 of the tank 6 and includes an elongated tubular body 38 perforated with holes 40. The holes 40 are arranged and sized to distribute water at a reduced flowrate in comparison to the flowrate of the water entering the inlet 8 of the tank. A second water distribution device 42 may be mounted about the outlet 10 of the tank 6 to collect reheated water at a reduced flowrate in comparison to an outlet flowrate of the water in absence of the second water distribution device 42. Preferably, the holes 40 are located on the elongated body 38 such that the water is injected or collected downwardly inside the tank.

In some implementations, the water heating unit may include one or more strengthening structure(s), such as one or more strengthening plate(s) that can be mounted across the tank so as to prevent the tank walls from warping. The strengthening plate is provided with openings so as to let the water flow therethrough. The strengthening plate provides strength to the tank without weighing excessively the tank. Alternatively, the tank walls may be consolidated with any means known in the art.

In some implementations, the water heating unit may include a safety tank in fluid communication with the tank so as to receive water escaping from the tank in case of water leak or maintenance operation on the tank. An outlet of the safety tank is operatively connected to a drain valve and pump so as to empty the safety tank, similarly to installations of a dishwasher for example. Optionally, the safety tank may be made of light weight material, for example plastic, preferably clear plastic. Optionally, the safety tank may be mounted on the tank so as to surround an exterior surface of the tank, thereby minimizing the space occupied by the safety tank. Alternatively, the safety tank may be located adjacent to the tank. Further optionally, the safety tank may be operatively connected to at least one of a water level detector and an alarm. The alarm is configured to warn a user when water is present in the safety tank. The water level detector is configured to inform a user of the level of the water present in the safety tank, thereby providing indication of the extent of the water leak from the tank for example.

It should be understood that the water heating unit may include any other devices that can improve safety and durability of the water heating unit operation. For example, as known for typical water heating devices, the water heating unit according to the present invention may include an anode mounted inside the tank, a drain valve to empty the tank when needed, an output safety pressure valve, a check valve avoiding return of the reheated water inside the tank and any other temperature or pressure sensors or thermostats ensuring safety of the operation.

A water circuit making use of a water heating assembly according to the present invention is able to provide water at an adequate user temperature in a reduced time. The installation of the water heating assembly in an existing water circuit is simple and reliable so as to enable to save time, energy and money without wasting water at the point of use while waiting for the adequate user temperature. Additionally, as the temperature set point can be inferior to locally imposed temperature threshold for hot water (e.g. 60° C. for elimination of bacteria in remote principal water heaters), people can be provided with water at a safer temperature for babies or elderlies at the point of use. Domestic appliances could also be more efficient as they benefit from water at the adequate temperature from the very beginning of their operation cycle.

It should be understood that the water heating assembly as defined herein can be configured to provide cold water to a point of use without departing from the scope of the present invention. The water heating unit may be equipped to refrigerate water near an adequate temperature set point. The inlet temperature of the water may be sensed and the valve may be actuated when the sensed inlet temperature is near the temperature set-point. The valve remains closed when the inlet temperature is above the temperature set-point.

In another aspect of the present invention, the various above-defined components and devices of the water heating assembly may be provided as a kit for mounting the water heating assembly on an existing domestic water circuit. The various components and devices may be installable according to any existing and available method to a person skilled in the art of plumbing and electrical equipment.

Experimental Series

Series of experiments have been performed with a water heating assembly according to the present invention and installed in a domestic household, more particularly to provide heated water to a kitchen sink and a dishwasher. The configuration used for the water heating assembly in the series of experiments is similar to the configuration illustrated in FIG. 12.

The water heating assembly included a tank of 11.5 L, a first 1500 W heating element coupled with three thermostats, and a second 750 W heating element coupled with one thermostat and a solenoid valve coupled with an inlet temperature sensor as defined above. The temperature set-point at which the solenoid valve opened was chosen to be 58° C., i.e. the solenoid valve let the water flow through the bypass piping to the point of use when the sensed inlet temperature of the water was at least 58° C. The water inside the tank was heated to a secondary temperature set point of 60° C. which was controlled by the thermostat. Finally, the solenoid valve was actuated to close the bypass piping when the sensed inlet temperature reached a tertiary temperature set point chosen to be 57.7° C.

Figure 17:
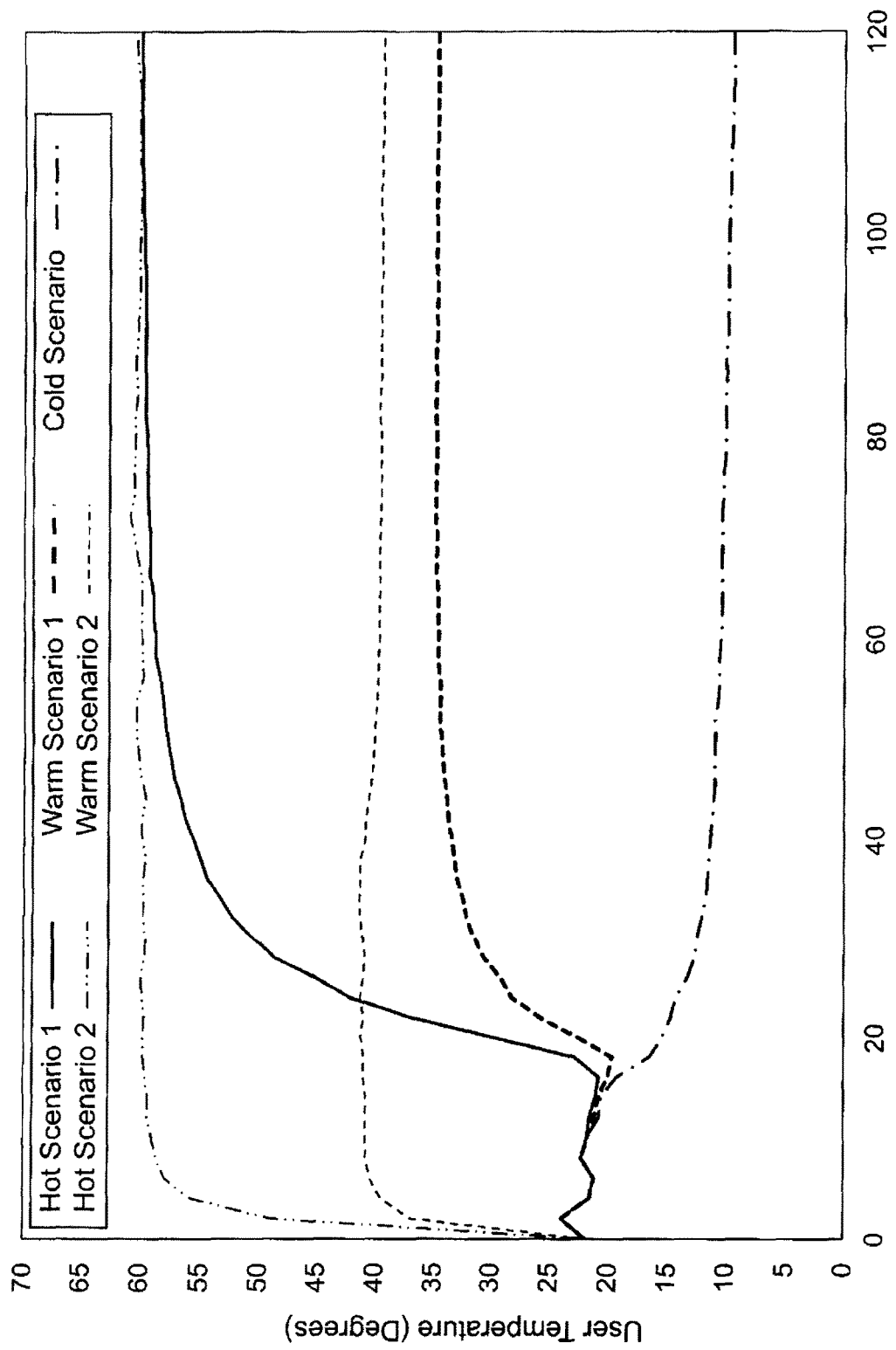
FIG. 17 is a graph showing monitored user temperature of the water at a point of use according to time according to an embodiment of the present invention.
Figure 18:
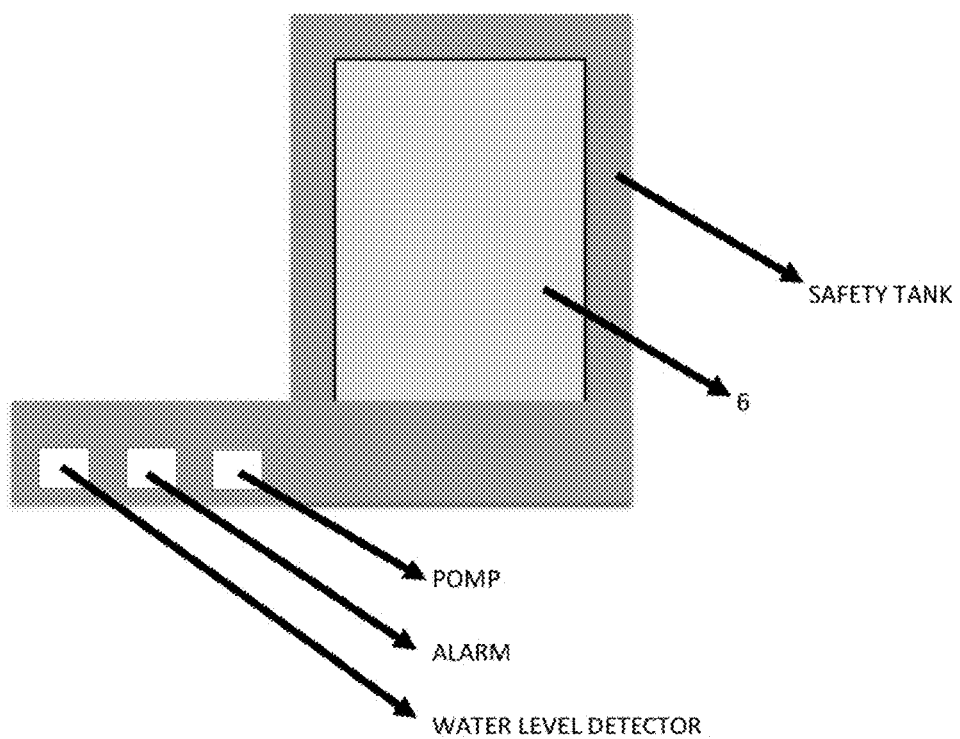

FIG. 17 is a graph showing monitoring of the water temperature at the kitchen sink when delivering cold water (cold scenario), warm water in absence of the water heating assembly (warm scenario 1), warm water in presence of the water heating assembly (warm scenario 2), hot water in absence of the water heating assembly (hot scenario 1) and hot water in presence of the water heating assembly (hot scenario 2), at a flowrate of 8 L/min.

FIG. 17 shows that the response time for providing heated water at the adequate user temperature is shorter when making use of the water heating assembly according to the present invention (warm scenario 2 and hot scenario 2). More particularly, in each corresponding scenario, about twenty seconds were necessary to provide water at a user temperature near 25° C. whereas the same user temperature was reached in the first seconds when making use of the water heating assembly according to the present invention. For the hot scenarios, the same user temperature of 59° C. was reached after 10 seconds with the water heating assembly in comparison to 62 seconds without the water heating assembly.

At the time the valve opens at 52 seconds while the water temperature at the point of use is at 59.8° C., one skilled in the art will under stand that the point of use is fed mainly with water from the hot water source and partially from the water heating unit. A loss of 6.5 L of water is avoided by the use of the water heating unit, which saves 0.5 KW/h of energy at each use period.

It should be noted that the experimental results have been obtained with a telescopic tap of 120 cm and one skilled in the art will readily understand that the time response would be even more reduced with a regular tap.

The invention claimed is:

1. A water heating assembly for providing reheated water to a point of use, the assembly comprising:
   a water heating unit for mounting between a first piping section and a second piping section, thereby defining a heating path the water heating unit comprising:
   a tank having an inlet in fluid communication with the first piping section for receiving water from a hot water source and an outlet in fluid communication with the second piping section for evacuating the reheated water to a temperature set point, and
   at least one heating element installed inside the tank to heat water contained in the tank up to the temperature set point and produce the reheated water;
   a temperature control assembly comprising:
   an inlet temperature sensor mounted on the first piping section for sensing an inlet temperature of the water fed to the inlet of the tank, and
   a valve actuator operatively connected to the inlet temperature sensor,
   a valve for mounting on a bypass piping defining a bypass path allowing a portion of the water from the hot water source to bypass the water heating unit and directly feed the point of use, the valve being switchable by the valve actuator between:
   a first position closing the bypass path when the sensed inlet temperature is below the temperature set point, thereby forcing water to follow the heating path, and
   a second position opening the bypass path when the sensed inlet temperature is at or above the temperature set point, thereby allowing water to follow the bypass path and the heating path, and
   a flowmeter mounted on the first piping section or on the inlet of the tank for measuring a flow of water fed through the inlet of the tank, the flowmeter comprising a second valve actuator operatively connected to the valve mounted on the bypass piping, the valve being switchable by the second valve actuator between:
   a first position closing the bypass path when the flowmeter does not detect a flow of water entering into the tank after a determined period of time, thereby forcing water to follow the heating path even if the sensed inlet temperature is at or above the temperature set point, and
   a second position opening the bypass path when the flowmeter detects that a determined amount of water has entered into the tank, thereby allowing water to follow the bypass path and the heating path even if the sensed inlet temperature is below the temperature set point.

2. The water heating assembly of claim 1, wherein the temperature control assembly further comprises at least one operation temperature sensor for sensing a temperature of the water inside the tank.

3. The water heating assembly of claim 2, wherein the at least one operation temperature sensor comprises:
   a first temperature sensor located in a lower part of the tank,
   a second temperature sensor located in a central part of the tank, and
   a third temperature sensor located in an upper part of the tank.

4. The water heating assembly of claim 2, wherein the at least one operation temperature sensor comprises an infrared thermometer, a thermocouple, a quartz thermometer or a combination thereof.

5. The water heating assembly of claim 2, wherein the temperature control assembly further comprises a controller operatively connected to the at least one heating element and responsive to the at least one operation temperature sensor, to manage or control the first temperature set point.

6. The water heating assembly of claim 1, wherein the temperature control assembly further comprises an outlet temperature sensor mounted upstream of the water outlet of the tank so as to sense the temperature of the water exiting the water heating unit, the outlet temperature sensor being operatively connected to the valve, at least one further valve, the at least one heating element, a device allowing to measure the efficiency of the water heating assembly, and/or an alarm.

7. The water heating assembly of claim 1, wherein the tank is made of vitreous enamel-lined carbon steel, stainless steel, copper or a combination thereof.

8. The water heating assembly of claim 1, wherein the valve comprises at least two ports.

9. The water heating assembly of claim 1, wherein the valve is a ball valve, a solenoid valve, a gate valve, a knife valve, a plug valve, or a thermostatic valve.

10. The water heating assembly of claim 1, wherein the valve actuator remotely actuates the valve, or actuates the valve from an inside of the valve.

11. The water heating assembly of claim 1, wherein the inlet of the tank for receiving water receives water at a controlled or reduced flowrate.

12. The water heating assembly of claim 1, wherein when the valve positioned on the bypass piping is a two-port valve.

13. The water heating assembly of claim 1, further comprising a water distribution device mounted inside the tank so as to be in fluid communication with the water inlet, the water distribution device comprising:
   an elongated body projecting inwardly from the inlet of the tank, and
   a plurality of holes being arranged along the elongated body, oriented toward the bottom of the tank and sized to distribute water at a reduced flowrate across a lower portion of the tank.

14. The water heating assembly of claim 1, further comprising a device for collecting re-heated water, the device being mounted inside the tank so as to be in fluid communication with the water outlet, the device for collecting re-heated water comprising:
   an elongated body projecting inwardly from the outlet of the tank, and
   a plurality of holes arranged along the elongated body, oriented toward the top of the tank and sized to collect water at a reduced flowrate across an upper portion of the tank, the reduced flowrate being reduced in comparison to a flowrate of water across the outlet of the tank in absence of the device for collecting re-heated water.

15. A water heating assembly kit for reheating water to be provided to a point of use, the kit comprising:
a water heating unit mountable between a first piping section and a second piping section, thereby defining a heating path, the water heating unit comprising:
a tank having a water inlet connectable to the first piping section for receiving water from a hot water source and a water outlet connectable to the second piping section for evacuating the reheated water to a temperature set point, and
at least one heating element mountable inside the tank to heat the water contained in the tank up to the temperature set point and produce the reheated water;
an inlet temperature sensor mountable on the first piping section for sensing an inlet temperature of the water fed to the water inlet of the tank, and
a valve actuator operatively connectable to the inlet temperature sensor;
a bypass piping for connecting between the first piping section to the second piping section, and defining a bypass path which allows a portion of the water from the hot water source to bypass the water heating unit and to feed the point of use;
a valve for mounting on the bypass piping, the valve being switchable by the valve actuator between:
a first position closing the bypass path when the sensed inlet temperature is below the temperature set point, thereby forcing water to follow the heating path, and
a second position opening the bypass path when the sensed inlet temperature is at or above the temperature set point, thereby allowing water to follow the bypass path and the heating path, and
a flowmeter for mounting on the first piping section or on the inlet of the tank for measuring a flow of water fed through the inlet of the tank, the flowmeter comprising a second valve actuator operatively connectable to the valve for mounting on the bypass piping, the valve being switchable by the second valve actuator between:
a first position closing the bypass path when the flowmeter does not detect a flow of water entering into the tank after a determined period of time, thereby forcing water to follow the heating path even if the sensed inlet temperature is at or above the temperature set point, and
a second position opening the bypass path when the flowmeter detects that a determined amount of water has entered into the tank, thereby allowing water to follow the bypass path and the heating path even if the sensed inlet temperature is below the temperature set point.

16. The water heating assembly kit of claim 15, further comprising a water distribution device for mounting inside the tank so as to be in fluid communication with the water inlet, the water distribution device comprising:
an elongated body projecting inwardly from the inlet of the tank, and
a plurality of holes being arranged along the elongated body, oriented toward the bottom of the tank and sized to distribute water at a reduced flowrate across a lower portion of the tank.

17. The water heating assembly kit of claim 15, further comprising a device for collecting re-heated water, said device being mountable inside the tank so as to be in fluid communication with the water outlet, the device for collecting re-heated water comprising:
an elongated body projecting inwardly from the outlet of the tank, and
a plurality of holes arranged along the elongated body, oriented toward the top of the tank and sized to collect water at a reduced flowrate across an upper portion of the tank.

18. A method for reducing response time of hot water at a point of use, the method comprising the steps of:
providing water flowing from a hot water source to the point of use;
sensing a temperature of the water downstream the hot water source and upstream of the point of use;
feeding the water to a heating path wherein the water is heated up by a water heating assembly, as defined in claim 1, to the temperature set point upstream to the point of use, regardless of the sensed temperature; and
feeding the water to a bypass path wherein the water flows from the hot water source directly to the point of use without additional heating when the sensed temperature is at or above the temperature set point.

19. The method of claim 18, wherein the method further comprises controlling the temperature set point.

20. The method of claim 18, wherein the feeding of the water to the heating path is performed at a controlled or reduced flowrate.

21. The method of claim 18, further comprising sensing a temperature of the water within at least one location of the inside of the tank.

22. The method of claim 21, wherein the sensing of the temperature inside the tank is performed in at least three locations including a lower part, a central part and an upper part of the tank.

* * * * *